2,797,811

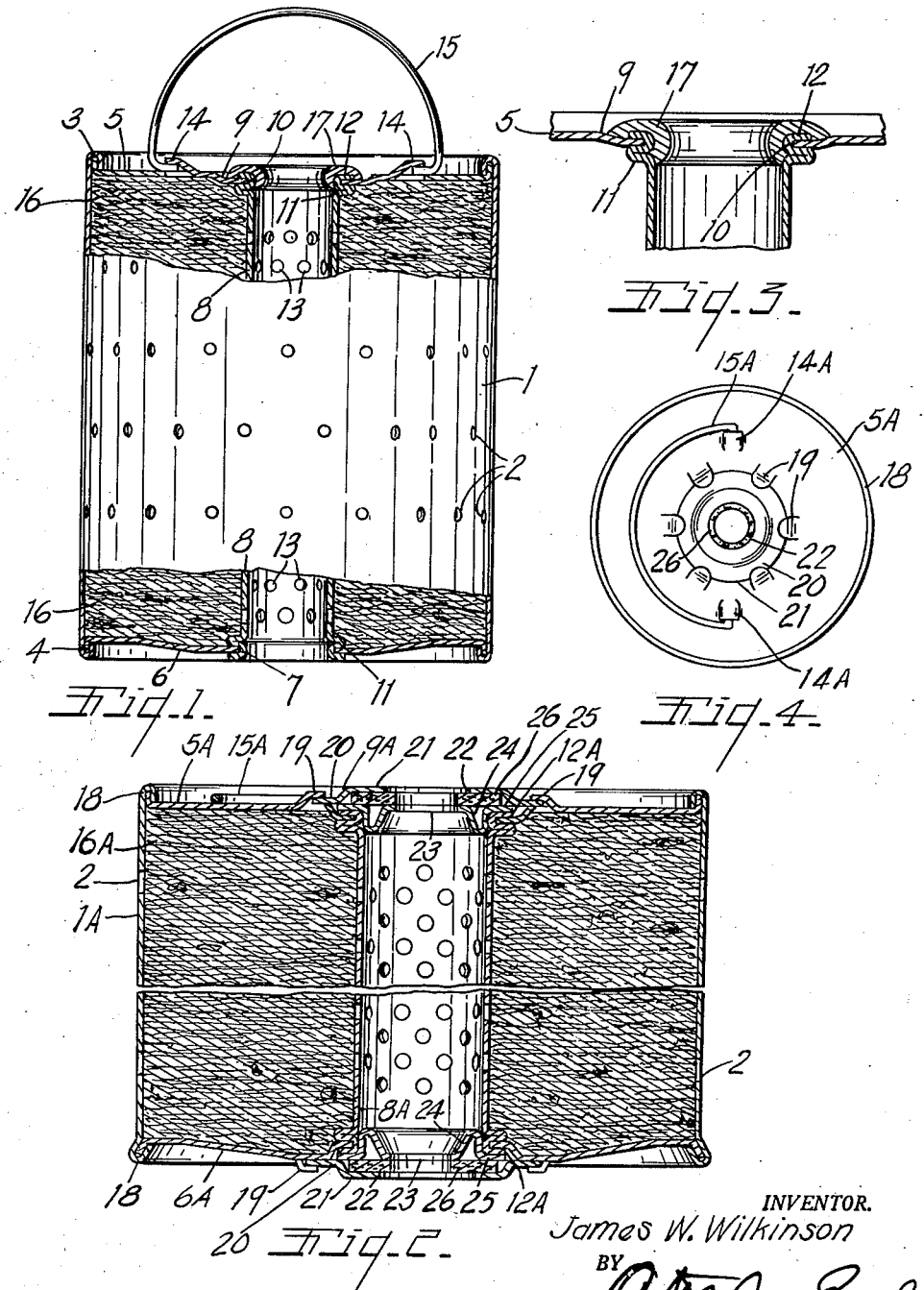

OIL FILTER CARTRIDGE

James W. Wilkinson, Hastings, Mich., assignor to Hastings Manufacturing Company, Hastings, Mich., a corporation of Michigan Division of application Serial No. 686,547, July 26, 1946, now Patent No. 2,584,771, dated February 5, 1952. Continuation of application Serial No. 793,887, December 26, 1947. This application March 20, 1956, Serial No. 572,716

9 Claims. (Cl. 210—65)

This invention relates to improvements in oil filter cartridge.

This application is a continuation of my application for Letters Patent filed December 26, 1947, Serial No. 793,887, now abandoned.

The principal objects of this invention are:

First, to provide a filter cartridge which is highly efficient and useful for a long period and at the same time economical in structure and manufacture.

Second, to provide a cartridge which may be easily and uniformly constructed using mass production methods.

Third, to provide novel forms of seals for the ends of an oil filter cartridge which are easy to manufacture and which make a tight connection with the oil return pipe of an oil filter.

Fourth, to provide a filter cartridge which has a high capacity to attract and hold contaminants in the oil of an internal combustion engine.

Other objects and advantages pertaining to the details and economies of my filter will be apparent from a consideration of the following description and claims. The drawings, of which there is one sheet, illustrate a preferred form and one modified form of my oil filter.

Fig. 1 is a side elevational view partially broken away in vertical cross section through the preferred form of my oil filter.

Fig. 2 is a fragmentary vertical cross sectional view through a modified form of my oil filter.

Fig. 3 is a fragmentary enlarged cross sectional view illustrating in detail the seal at the end of the filter shown in Fig. 1.

Fig. 4 is a plan view of the filter cartridge shown in Fig. 2.

The subject matter of this invention has been divided from my application for Filter Cartridges and Method of Making, Serial No. 686,547, filed July 26, 1946, Patent No. 2,584,771, issued February 5, 1952.

The preferred form of my filter cartridge illustrated in Figs. 1 and 3 consists of a cylindrical body or side wall member 1 formed of light gage metal rolled into cylindrical shape and seamed to provide an open end cylinder. The body member defines a series of apertures 2 for the passage of oil into the cartridge and the ends of the body member are folded inwardly and crimped as at 3 and 4, over the out-turned flanges of the top and bottom panel 5 and 6 respectively.

The bottom panel 6 has a downwardly dished center portion defining a central aperture 7 which receives the lower end of the oil return tube 8. The top panel 5 is provided with a downwardly or inwardly depressed portion 9 defining a central aperture 10 which receives the upper end of the oil return tube 8. Adjacent to its ends the oil return tube 8 is shaped with return bends 11 forming annular beads around the tube and against which the top and bottom panels 5 and 6 are seated. The ends of the oil return tube are rolled or seamed radially outwardly of the tube to clamp and seal the ends of the tube to the top and bottom panels as at 12. The oil return tube 8 defines a plurality of apertures 13 through which oil may pass from the cartridge to the tube.

The upper end panel 5 is provided with a pair of diametrically opposed sockets 14 stamped upwardly from the top panel and arranged to receive the inturned ends of a bail-like handle 15.

The space between the oil return tube and the cylindrical body member is filled with a mass of filter media 16 which consists of uniformly packed untreated or "unkiered" linters having a high natural wax content. The linters are packed in the cartridge to a uniform density of between 180 to 274 grams per 65 cubic inches of space. None of the wax content of the linters is removed by mechanical or chemical treating processes and I have found that linters of this type packed to the uniform density described are less susceptible to moisture in the oil so that as oil is passed through the cartridge water is not retained by the linters to clog and render the cartridge useless.

The method for packing the linters or other filter media in the cartridge is more particularly described and claimed in my above mentioned application.

The upper seam 12 between the top of the oil return tube and the top cover panel 5 is covered with an annular rubber gasket 17 which is conveniently applied by spraying the end of the tube with a fluid, rubber-like material which will harden upon exposure to the air to provide a soft, yielding gasket bonded around the upper end of the tube. The gasket 17 is adapted to engage the oil return conduit of an oil filter such as that described in another of my applications for Oil Filters, Serial No. 686,546, filed July 26, 1946, Patent No. 2,511,800, issued June 13, 1950. The gasket 17 can be applied to either the top or bottom end of the oil return tube or to both ends as required by the container in which it is to be used.

The modified form of filter illustrated in Figs. 2 and 4 consists of a cylindrical body member 1A and top and bottom panels 5A and 6A respectively, which are secured to the ends of the body member by crimping or seaming as at 18.

The top panel 5A has an annular depressed center portion 9A which is considerably lower than the corresponding depression in the top panel 5. The depressed portion 9A defines an aperture for receiving the upper end of the oil return tube 8A. The upper end of the oil return tube 8A is crimped or seamed over this depressed portion as at 12A. The top panel 5A further defines a series of circularly arranged outwardly punched ears 19 adapted to retainingly receive the annular flange 20 of a retaining disk 21. The center of the retaining disk 21 is pressed outwardly and defines an aperture 22 for receiving the end of the oil return pipe of the oil filter (not shown). A seal supporting ring or seat 23 provided with a return bend 24 fitting within the upper end of the oil return tube and terminating in an outwardly turned annular flange 25 is seated inwardly of the cartridge from the retaining ring 21, the flange 25 resting on the seamed portion 12A of the oil return tube. A sealing gasket 26 of cork or fibre material is clamped between the retaining disk 21 and seat 23 as shown. The top panel 5A further defines the outwardly struck sockets 14A for receiving the handle 15A (see Fig. 4) on the cartridge.

The lower end of the oil return tube and the lower cover panel 6A are provided with a seal construction the same as that at the upper end of the cartridge.

The embodiment of my oil filter cartridge just described and illustrated in Figs. 2 and 4 is packed, as at 16A, with a uniformly compressed mass of cotton linters as described in connection with the filter cartridge shown in Figs. 1 and 3. The seal between the oil return tube of the cartridge and the oil return conduit of the oil filter is arranged to be made by pressing the conduit into the central aperture of one or both of the sealing gaskets 26.

In both forms of my cartridge, the filter media is packed with a substantially uniform density throughout the body of the cartridge so that there is no path of least resistance for the oil flowing therethrough to take. Each fiber of the filtering material is thus subjected to the same amount of oil as similarly located fibers and all portions of the filtering material will function to pick up contaminants in the oil. As a result there is no waste of the filtering capacity of my cartridge and its useful life is increased. The density of the filter media described above has been found to be particularly effective in automotive oil filters, the spacing of the fibers being such as to contact most of the foreign particles in the oil without offering too high a resistance to the passage of oil through the cartridge.

I have thus described two highly practical commercial forms of my filter cartridge so that others may reproduce the same with such minor modifications as are desired without further description.

Having thus described my invention, what I claim as new and desire to secure by Letters Patent is:

1. An oil filter cartridge comprising a cylindrical foraminate body, top and bottom walls for said body having axially out-turned peripheral flanges, the ends of the body being seamed around said flanges, a foraminate oil return tube disposed centrally within said body and having external annular beads adjacent the ends of the tube, said top and bottom walls having apertures receiving the ends of the tube, the ends of the tube being folded outwardly upon said top and bottom walls to seal the same against said beads, and unkiered cotton linters having their full natural wax content compacted in substantially uniform density throughout said body in the ratio of between 180 and 274 grams per 65 cubic inches of space in said body.

2. An oil filter cartridge comprising a cylindrical foraminate body, top and bottom walls for said body having axially out-turned peripheral flanges, the ends of the body being seamed around said flanges, a foraminate oil return tube disposed centrally within said body and having external annular beads adjacent the ends of the tube, said top and bottom walls having apertures receiving the ends of the tube, the ends of the tube being folded outwardly upon said top and bottom walls to seal the same against said beads, and unkiered cotton linters having their full natural wax content compacted in substantially uniform density throughout said body.

3. An oil filter cartridge comprising a cylindrical foraminate side wall, end walls having out-turned peripheral flanges, the ends of said side wall being crimped around said flanges, a foraminate oil return tube extending through the center of said body and having external annular beads near the ends of the tube, said end walls having apertures receiving the tube, the ends of said tube being folded outwardly over said end walls, radially inwardly directed ears pressed axially outwardly from said end walls and disposed around said tube, apertured inner seats having annular return bend folds pressed into the ends of said tube, radially extending inner and outer flanges on the outer edges of said folds with the outer flanges seated against the outturned ends of said tube, apertured outer retaining discs secured to said cartridge by said ears, and annular cork seals positioned between said seats and discs, said cartridge being packed throughout with unkiered cotton linters having a high natural wax content to a substantially uniform density of between 180 to 274 grams per 65 cu. in. of space.

4. An oil filter cartridge comprising a cylindrical foraminate side wall, end walls having axially outturned peripheral flanges, the ends of said side wall being crimped around said flanges, a foraminate oil return tube extending through the center of said body and having external annular beads near the ends of the tube, said end walls having apertures receiving the tube, the ends of said tube being folded outwardly over said end walls, radially inwardly directed ears pressed axially outwardly from said end walls and disposed around said tube, apertured inner seats having annular return bend folds pressed into the ends of said tube, radially extending inner and outer flanges on the outer edges of said folds with the outer flanges seated against the outturned ends of said tube, apertured outer retaining discs secured to said cartridge by said ears, and annular seals positioned between said seats and discs, said cartridge being packed throughout with unkiered cotton linters having a high natural wax content to a substantially uniform density.

5. An oil filter cartridge comprising a cylindrical foraminate side wall, end walls having axially outturned peripheral flanges, the ends of said side wall being crimped around said flanges, a foraminate oil return tube extending through the center of said body and having external annular beads near the ends of the tube, said end walls having apertures receiving the tube, the ends of said tube being folded outwardly over said end walls, ears pressed axially outwardly on one of said end walls and disposed around said tube, an apertured inner seat having an axially extending portion pressed into one end of said tube, a radially extending flange on the outer end of said seat lapped on the end of said tube, an apertured outer retaining disc secured to said cartridge by said ears, and an annular seal positioned between said seat and disc, said cartridge being packed throughout with unkiered cotton linters having their full natural wax content to a substantially uniform density of between 180 to 274 grams per 65 cu. in. of space.

6. An oil filter cartridge comprising a cylindrical foraminate side wall, end walls having outturned peripheral flanges, the ends of said side wall being crimped around said flanges, a foraminate oil return tube extending through the center of said body, said end walls having apertures receiving the ends of said tube, ears pressed axially outwardly on one of said end walls and disposed around said tube, an apertured inner seat having an axially extending portion pressed into one end of said tube, a radially extending flange on the outer end of said seat lapped on the end of said tube, an apertured outer retaining disc secured to said end wall by said ears, an annular seal positioned between said seat and disc, and unkiered cotton linters having their full natural wax content packed with uniform density throughout said body.

7. A body of filtering material for use in oil filtering cartridges for internal combustion engines consisting essentially of unkiered cotton linters having their full natural wax content and packed to a substantially uniform density.

8. The use as a filtering medium in internal combustion engines of a body of filtering material consisting essentially of unkiered cotton linters having their full natural wax content and packed to a substantially uniform density throughout said body.

9. A method of filtering internal combustion engine oil which comprises passing the oil to be filtered through a body of filtering material consisting essentially of unkiered cotton linters having their full natural wax content and packed to substantially uniform density throughout said body.

References Cited in the file of this patent

UNITED STATES PATENTS

| | | |
|---|---|---|
| 2,168,125 | Hurn | Aug. 1, 1939 |
| 2,294,262 | Wilkinson | Aug. 25, 1942 |
| 2,301,121 | Kamrath | Nov. 3, 1942 |